(12) United States Patent
Morris et al.

(10) Patent No.: US 8,434,773 B2
(45) Date of Patent: May 7, 2013

(54) LIFT AXLE CONTROL VALVE

(75) Inventors: John Michael Morris, Auburn, WA (US); Kevin Vincent Curtin, Seattle, WA (US)

(73) Assignee: Norgren GT Development Corporation, Auburn, WA (US)

( * ) Notice: Subject to any disclaimer, the term of this patent is extended or adjusted under 35 U.S.C. 154(b) by 256 days.

(21) Appl. No.: 12/901,103

(22) Filed: Oct. 8, 2010

(65) Prior Publication Data

US 2011/0101257 A1 May 5, 2011

Related U.S. Application Data

(60) Provisional application No. 61/257,293, filed on Nov. 2, 2009.

(51) Int. Cl.
*B60G 11/27* (2006.01)
(52) U.S. Cl.
USPC ................. 280/124.157; 280/86.5; 137/625.2
(58) Field of Classification Search .......................... None
See application file for complete search history.

(56) References Cited

U.S. PATENT DOCUMENTS

| | | | |
|---|---|---|---|
| 5,025,877 A | 6/1991 | Assh | |
| 6,398,236 B1 * | 6/2002 | Richardson | 280/86.5 |
| 6,572,124 B2 * | 6/2003 | Mlsna et al. | 280/86.5 |
| 6,810,982 B2 * | 11/2004 | Kuhn et al. | 180/209 |
| 6,845,989 B2 * | 1/2005 | Fulton et al. | 280/6.157 |
| 6,983,201 B2 * | 1/2006 | Misawa | 701/37 |
| 7,735,516 B2 * | 6/2010 | Morris | 137/596.15 |
| 7,959,173 B1 * | 6/2011 | Morroney | 280/124.157 |
| 2003/0151222 A1 * | 8/2003 | Sutton et al. | 280/86.5 |
| 2005/0269753 A1 | 12/2005 | Geiger et al. | |
| 2006/0158023 A1 * | 7/2006 | Gottschalk et al. | 301/127 |
| 2007/0277886 A1 | 12/2007 | Morris | |
| 2010/0140883 A1 * | 6/2010 | Hammond | 280/5.503 |
| 2012/0126504 A1 * | 5/2012 | Piehl et al. | 280/124.116 |
| 2012/0138826 A1 * | 6/2012 | Morris et al. | 251/12 |

* cited by examiner

*Primary Examiner* — Joseph Rocca
*Assistant Examiner* — James English
(74) *Attorney, Agent, or Firm* — The Ollila Law Group, LLC

(57) ABSTRACT

A lift axle control valve (200) for controlling a vehicle lift axle is provided. The valve (200) includes a vehicle port (103) configured to receive a vehicle pressure and a suspension port (106) configured to receive a suspension pressure. The valve (200) is configured to receive a lift axle control signal, actuate the lift axle control valve (200) to connect one or more lift bag output ports (121) to the vehicle port (103) and to connect one or more load bag output ports (131) to the vent port (118) if the lift axle control signal comprises a lift command, and actuate the lift axle control valve (200) to connect the one or more load bag output ports (131) to the suspension port (106) and connect the one or more lift bag output ports (121) to the vent port (118) if the lift axle control signal comprises a load command.

10 Claims, 7 Drawing Sheets

LIFT AXLE CONTROL VALVE

This application claims benefit of, and priority from, U.S. provisional patent application No. 61/257,293, filed on Nov. 2, 2009 and entitled "Lift Axle Control Valve".

BACKGROUND OF THE INVENTION

1. Field of the Invention

The invention is related to the field of valves, and more particularly, to a lift axle control valve.

2. Description of the Prior Art

Lift axles are commonly used on heavy vehicles, such as trucks. They are used to bear weight when the vehicle is loaded and then can be lifted when unloaded. The lift axle is therefore used as needed.

The lift axle can be deployed to avoid exceeding weight limits when the vehicle is loaded. But when the lift axle is lifted or retracted, its wheels disengage from the road or other ground surface and no longer assist in the bearing of weight. When the load weight of the vehicle is less than the load capacity of the primary axles, the lift axle suspension may be raised to avoid extra wear on the lift axle and tires. Operating the vehicle with the lift axle suspension raised can also improve fuel economy, traction, and maneuverability. In addition, when the vehicle is driven in reverse, the positive castor angle of the lift axle wheels may hinder self-steering and cause excess wear to the tires. Raising the lift axle disengages the wheels from the ground, thereby avoiding these issues.

Many heavy vehicles include a pneumatic air system. Therefore, it is advantageous to use pneumatic air to both lift up and to move down and deploy a lift axle. When down, a load pressure is used to force the lift axle downward and bear a portion of the weight of the vehicle.

Heavy vehicles often use pneumatic air in a suspension system, where air springs are inflated in order to lift the vehicle and maintain a vehicle suspension height during operation. The pressure of the air being provided to such a pneumatic suspension system can be controlled in order to provide proper suspension height and proper suspension performance. The suspension or load air pressure can therefore be controlled in order to control ride performance.

One controlled ride performance characteristic is the ride height, which can be the amount of suspension element extension or can be the height of the vehicle frame from the suspension. Ride height can be controlled according to a loaded vehicle weight, a road roughness, etc. The ride height will determine the amount or range of movement of the suspension and can affect vehicle braking, cornering, ride roughness, load leveling, etc. Therefore, it is common practice to regulate the suspension air pressure in order to control the ride and handling of the vehicle.

Increased awareness of safety issues, and highway wear due to heavily loaded vehicles, has led to jurisdictions where lift axle loading is becoming regulated by governmental entities. The aim is to have lift axles be substantially equally loaded with the other non-lift axles of a vehicle. Excessive load bearing by a lift axle may cause poor braking and/or steering by the vehicle. Further, excessive load bearing by one axle of a vehicle will cause uneven or excessive road wear.

ASPECTS OF THE INVENTION

In some aspects of the invention, a lift axle control valve for controlling a vehicle lift axle comprises:
a vehicle port configured to receive a vehicle pressure; and
a suspension port configured to receive a suspension pressure;
wherein the lift axle control valve is configured to receive a lift axle control signal, actuate the lift axle control valve to connect one or more lift bag output ports to the vehicle port and to connect one or more load bag output ports to the vent port if the lift axle control signal comprises a lift command, and actuate the lift axle control valve to connect the one or more load bag output ports to the suspension port and connect the one or more lift bag output ports to the vent port if the lift axle control signal comprises a load command.

Preferably, the suspension pressure is regulated to substantially achieve a predetermined suspension height.

Preferably, the one or more lift bag output ports and the one or more load bag output ports are coupled to one or more lift axles.

Preferably, the lift axle control valve further includes a solenoid and the solenoid receives an electrical lift axle control signal.

Preferably, the lift axle control valve receives a pneumatic lift axle control signal.

In some aspects of the invention, a lift axle control valve for controlling a vehicle lift axle comprises:
a pilot piston configured to be actuated by a lift axle control signal;
a lift piston configured to move substantially in conjunction with the pilot piston and configured to place one or more lift bag output ports either in fluid communication with a vehicle port that provides vehicle pressure or in fluid communication with a vent port; and
a load piston configured to move in response to the pilot piston and configured to place one or more load bag output ports either in fluid communication with the vent port or in fluid communication with a suspension port that provides a suspension pressure;
wherein when the lift axle control valve is non-actuated, the lift piston places the one or more lift bag output ports in fluid communication with the vehicle port and the load piston places the one or more load bag output ports in fluid communication with the vent port; and
wherein when the lift axle control valve is actuated, the lift piston places the one or more lift bag output ports in fluid communication with the vent port and the load piston places the one or more load bag output ports in fluid communication with the suspension port.

Preferably, the suspension pressure is regulated to substantially achieve a predetermined suspension height.

Preferably, the one or more lift bag output ports and the one or more load bag output ports are coupled to one or more lift axles.

Preferably, the lift axle control valve includes a solenoid and the solenoid receives an electrical lift axle control signal.

Preferably, the lift axle control valve receiving a pneumatic lift axle control signal.

Preferably, further comprising a check valve that closes when the vehicle pressure drops below a predetermined minimum pressure.

In some aspects of the invention, a method of controlling a vehicle lift axle comprises:
receiving a lift axle control signal;
actuating the lift axle control valve to connect one or more lift bag output ports to a vehicle port and to connect one or more load bag output ports to a vent port if the lift axle control signal comprises a lift command; and
actuating the lift axle control valve to connect the one or more load bag output ports to a suspension port and connect the one or more lift bag output ports to the vent port if the lift axle control signal comprises a load command.

Preferably, the suspension pressure is regulated to substantially achieve a predetermined suspension height.

Preferably, the one or more lift bag output ports and the one or more load bag output ports are coupled to one or more lift axles.

Preferably, further comprising receiving an electrical lift axle control signal.

Preferably, further comprising receiving a pneumatic lift axle control signal.

BRIEF DESCRIPTION OF THE DRAWINGS

The same reference number represents the same element on all drawings. It should be understood that the drawings are not necessarily to scale.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
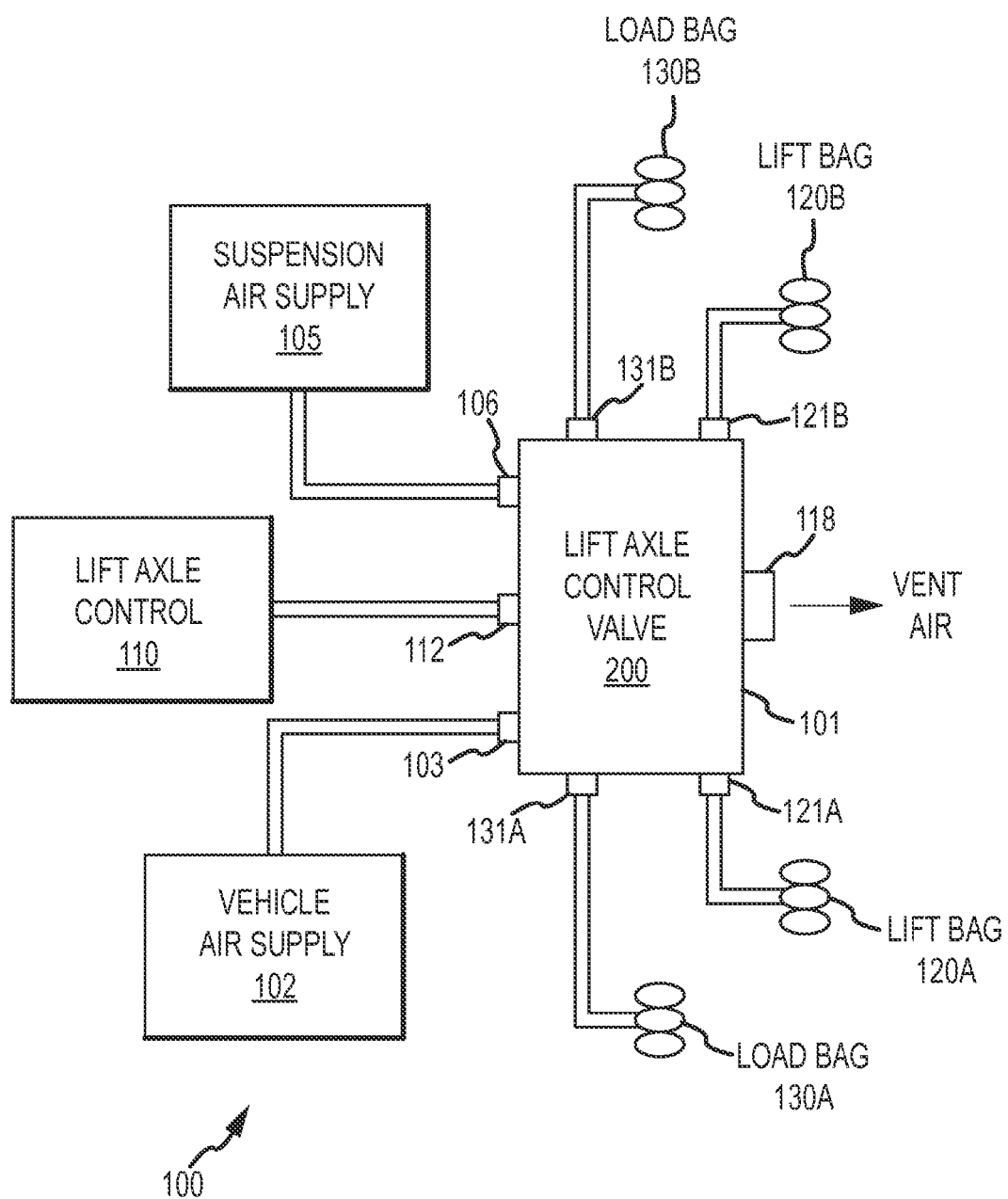
FIG. 1 shows a lift axle control system according to the invention.

FIG. 1 shows a lift axle control system 100 according to the invention. The lift axle control system 100 is used to lift and deploy a vehicular lift axle (not shown). The lift axle control system 100 includes a lift axle control valve 200, one or more lift bags 120A and 120B for lifting a lift axle when inflated, and one or more load bags 130A and 130B for deploying the lift axle when inflated.

In contrast to the prior art, the lift axle control valve 200 provides pneumatic air to the one or more load bags 130A and 130B at a suspension pressure. The suspension pressure comprises a pressure that is controlled according to one or more suspension characteristics of the vehicle, and can be further provided to one or more suspension devices of the vehicle. The suspension pressure is generally less than a vehicle pressure generated by an air system of the vehicle. The suspension pressure can vary according to the vehicle load, road conditions, wind conditions, vehicle angle, and/or other factors. Consequently, the lift axle is not deployed at a strictly fixed load amount or fixed pressure. This is in contrast to the prior art, where a fixed regulated pressure is supplied to the load bags, wherein a fixed load amount is born by the prior art lift axle when deployed. The lift axle control valve 200 provides pneumatic air to the lift bags at a vehicle pressure, i.e., essentially unregulated pressure.

The lift axle control valve 200 includes a body 101, a vehicle port 103, and a suspension port 106. The lift axle control valve 200 further includes one or more lift bag output ports 121A and 121B, one or more load bag output ports 131A and 131B, and a vent port 118.

The vehicle port 103 is configured to be connected to a vehicle air supply 102 and receive pneumatic vehicle air therefrom. The pneumatic air is generated by an air compressor of the vehicle, as maintained by the compressor and any manner of tanks, valves, conduits, etc. The vehicle air will typically be maintained at a high pressure so that the vehicle air can reliably power vehicle systems such as brakes, lift mechanisms including lift axles, and other vehicular systems, including trailers, dump systems, etc.

The suspension port 106 is configured to be connected to a suspension air supply 105 and receive pneumatic suspension air therefrom. The suspension air therefore may vary according to factors such as the loading of the vehicle, road conditions, or other variables. The suspension air is regulated and typically does not change with changes in the vehicle air pressure of the vehicle air system. The suspension air is set and controlled by the suspension system of the vehicle and may change when necessary to properly control the vehicular suspension system.

The lift axle control 110 comprises any manner of control unit for controlling the lifting and deploying of the lift axle. The lift axle control 110 subsequently controls the actuation of the lift axle control valve 200. In some embodiments, the lift axle control 110 includes an operator input such as a switch. It should be understood that the lift axle control 110 can further receive data/inputs from other vehicle systems.

The one or more lift bag output ports 121A and 121B are connected to the one or more corresponding lift bags 120A and 120B. The lift bags 120A and 120B are configured to lift up a lift axle when the bags are substantially inflated. It should be understood that any number of lift bag output ports can be employed, and any desired number of lift bags and/or lift axles can be used with a vehicle.

The one or more load bag output ports 131A and 131B are connected to the one or more corresponding load bags 130A and 130B. The load bags 130A and 130B are configured to deploy the lift axle and press it to the roadway when substantially inflated, placing a downward force on the deployed lift axle. As a result, a portion of the vehicle weight is born by the lift axle. The amount of load born by the lift axle will depend on the suspension pressure used to deploy the lift axle.

Unlike the prior art, however, the lift axle is not deployed at a fixed pressure and therefore does not bear a fixed weight. The lift axle as a result is controlled to bear a predetermined percentage of the vehicle weight. The lift axle can be deployed to bear a weight determined by road and load conditions and by a suspension controller or other suspension measurement system. The lift axle therefore can bear weight and can selectively comprise a suspension axle, similar to fixed vehicle axles. The lift axle will not be loaded with too much or too little weight, unlike in the prior art. Further, the lift axle load can be varied, accommodating road and load conditions. In some embodiments, the lift axle can be normally deployed and can be lifted under predetermined conditions, such as when the vehicle is in a reverse gear, for example.

The vent port 118 is a vent that can be connected to either the one or more lift bag output ports 121A and 121B, or alternatively, to the one or more load bag output ports 131A and 131B. When the vent port 118 is connected to the one or more lift bag output ports 121A and 121B, then air within the one or more lift bags 120A and 120B is vented. This is done approximately simultaneously with the one or more load bags 130A and 130B being inflated. Further, this is done in response to a received load command.

Conversely, when the vent port 118 is connected to the one or more load bag output ports 131A and 131B, then air within the one or more load bags 130A and 130B is vented. This is done approximately simultaneously with the one or more lift bags 120A and 120B being inflated. Further, this is done in response to a received lift command.

In operation, the lift axle control valve 200 receives a lift valve control input. The lift valve control input is commonly received as a result of action by the vehicle operation. In response, the lift axle control valve 200 actuates the lift axle control valve 200 to connect the one or more lift bag output ports 121A and 121B to the vehicle port 103 and to connect the one or more load bag output ports 131A and 131B to the vent port 118 if the lift axle control signal comprises a lift command, and actuates the lift axle control valve 200 to connect the one or more load bag output ports 131A and 131B to the suspension port 106 and connects the one or more lift bag output ports 121A and 121B to the vent port 118 if the lift axle control signal comprises a load command.

Figure 2:
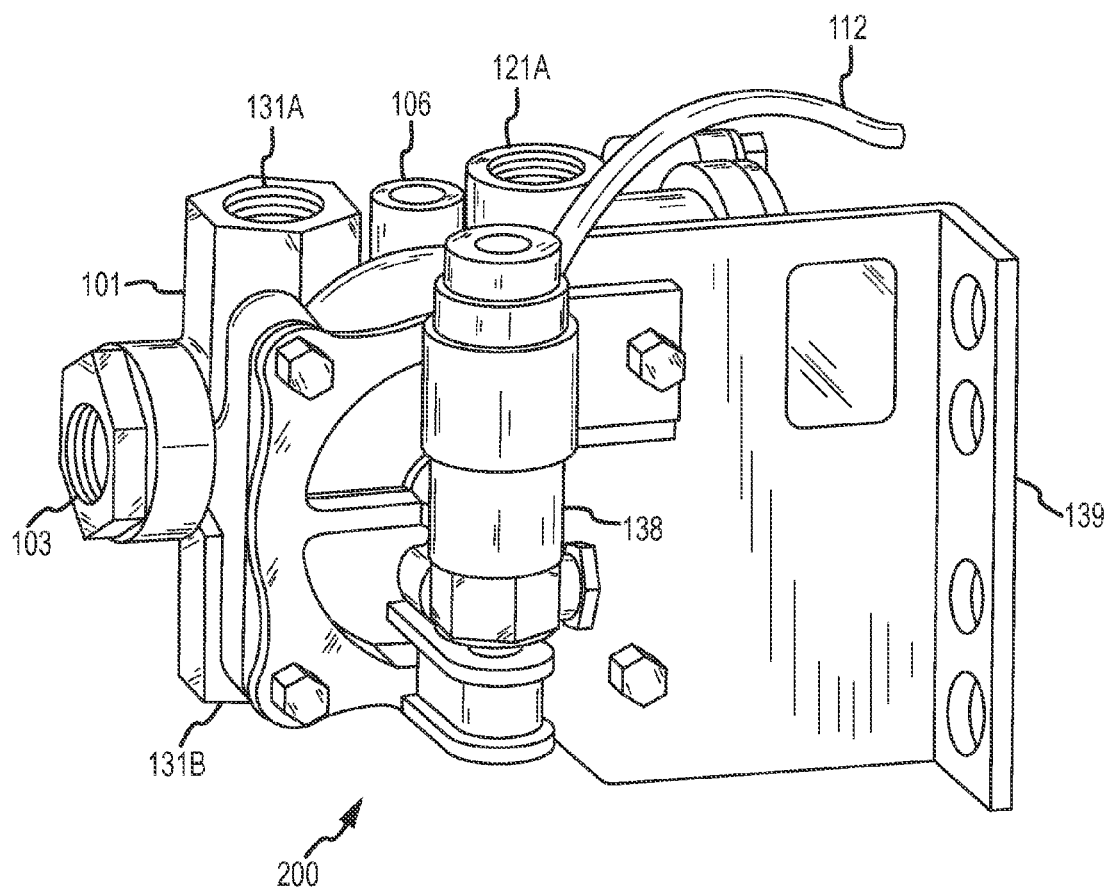
FIG. 2 is a perspective view of a lift axle control valve according to the invention.

FIG. 2 is a perspective view of the lift axle control valve 200 according to the invention. The lift axle control valve 200 in this embodiment includes the vehicle port 103, the suspension port 106, the one or more lift bag output ports 121A and 121B, and the one or more load bag output ports 131A and 131B. In addition, this embodiment shows a solenoid 138 and one or more wires 112 that conduct lift axle control signals to the solenoid 138, and a mounting element 153. The solenoid 138 also includes a pilot air port and conduit to a port located above the pilot piston 145 (not shown), wherein the solenoid 138 selectively provides pilot air to the lift axle control valve 200 in order to control an associated lift axle or axles. The one or more wires 112 can be connected to a switch, processor, circuitry, or other vehicle component.

Figure 3:
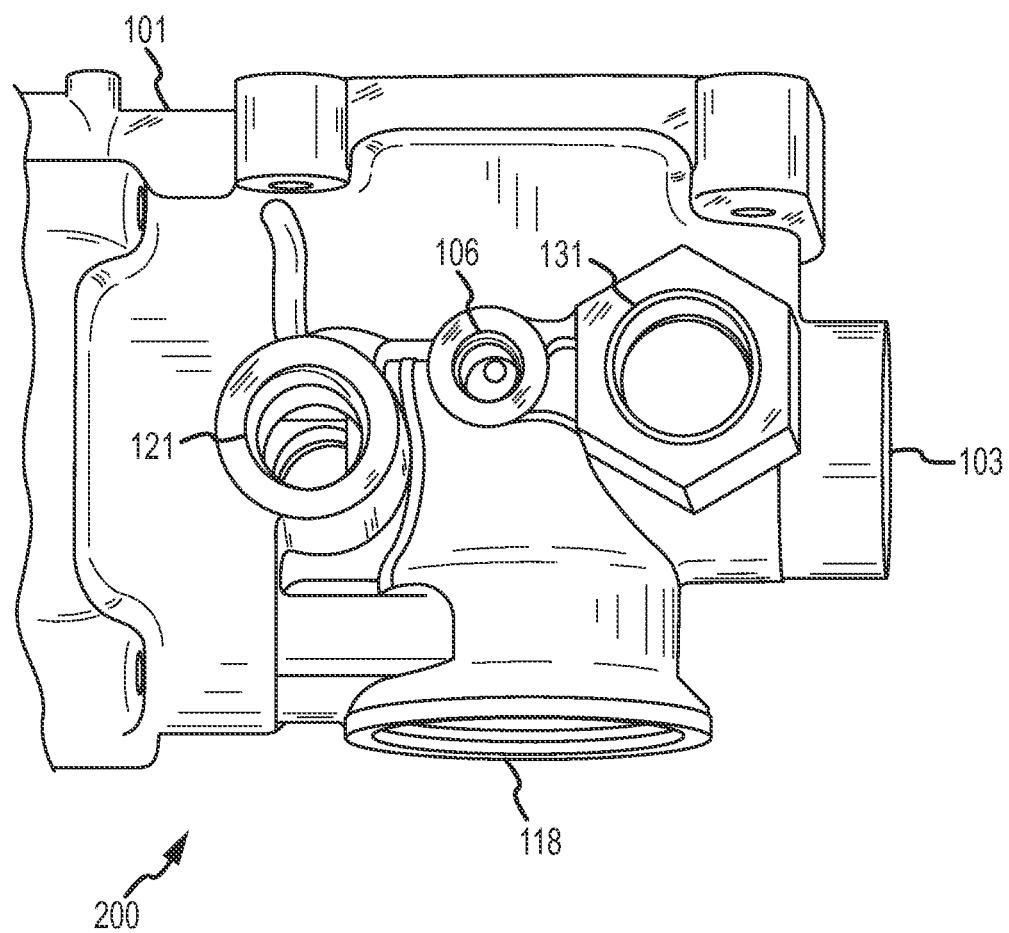
FIG. 3 is an overhead view of the lift axle control valve according to the invention.

FIG. 3 is an overhead view of the lift axle control valve 200 according to the invention. This view shows the location of one load bag output port 131 and the location of one lift bag output port 121. As was previously shown, the lift axle control valve 200 can include pairs of output ports, such as ports on opposing sides of the lift axle control valve 200. The figure further shows the vent port 118.

Figure 4:
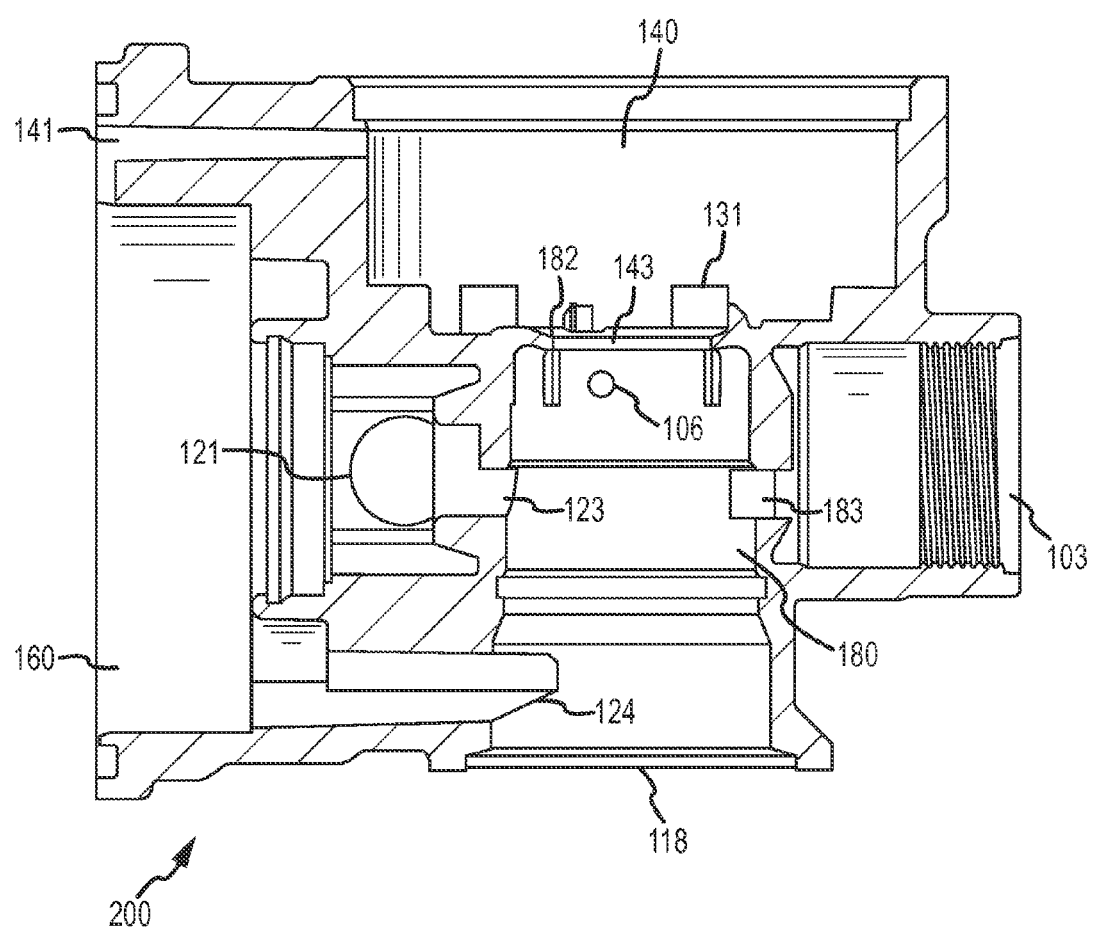
FIG. 4 is a cross-section view of the lift axle control valve without internal components.

FIG. 4 is a cross-section view of the lift axle control valve 200 without internal components, presented for clarity. This view shows the communication of a load bag output port 131 with a pilot piston chamber 140 and the communication of a lift bag output port 121 with a lift piston chamber 160. It should be understood that these two shown output ports can comprise one or more output ports, as previously discussed. The figure further shows the communication of the suspension port 106 with a load piston chamber 180 and shows the communication of the vehicle port 103 with the load piston chamber 180.

In addition, the figure shows passages connecting the various chambers. A pilot-lift passage 141 extends between the pilot piston chamber 140 and the lift piston chamber 160. A pilot-load passage 143 extends between the pilot piston chamber 140 and the load piston chamber 180. A lift-load passage 123 extends between the lift piston chamber 160 and the load piston chamber 180. A vehicle-load passage 183 extends between the vehicle port 103 and the load piston chamber 180. A lift-vent passage 124 extends between the lift piston chamber 160 and the load piston chamber 180, with the lift-vent passage 124 being in communication with a vent chamber portion of the load piston chamber 180 below the load piston 186.

The suspension port 106 supplies pneumatic air, at a suspension pressure, to the load piston chamber 180. Actuation of a load piston 186 (see FIG. 6) can selectively block or unblock the supply of suspension pressure air into the load piston chamber 180, as will be discussed below. It should be understood that the load spool 185 remains stationary.

The vehicle-load passage 183 supplies pneumatic air, at a vehicle system pressure, from the vehicle port 103 to the load piston chamber 180. Actuation of the load piston 186 can selectively block or unblock the pilot-load passage 143.

The lift-load passage 123 supplies vehicle pressure air from the vehicle port 103 to the one or more lift bag output ports 121A and 121B. Actuation of the lift piston 165 can selectively block or unblock the supply of vehicle pressure air to the lift bag output ports 121A and 121B and to the one or more lift bags 120A and 120B, as will be discussed below.

Figure 5:
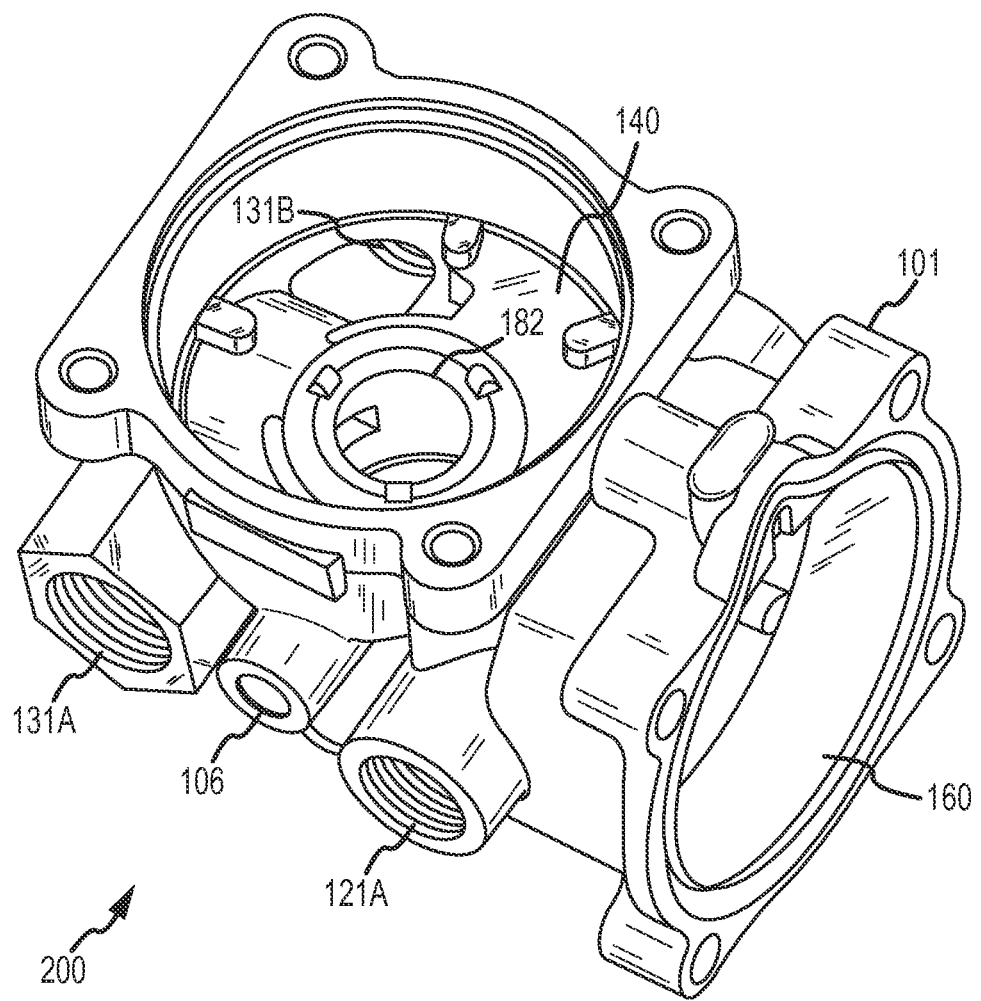
FIG. 5 is an elevation view of the body according to the invention.

FIG. 5 is an elevation view of the body 101 according to the invention. This view shows the load bag output port 131. The load bag output port 131 in this embodiment is below the bottom of the pilot piston chamber 140.

Figure 6:
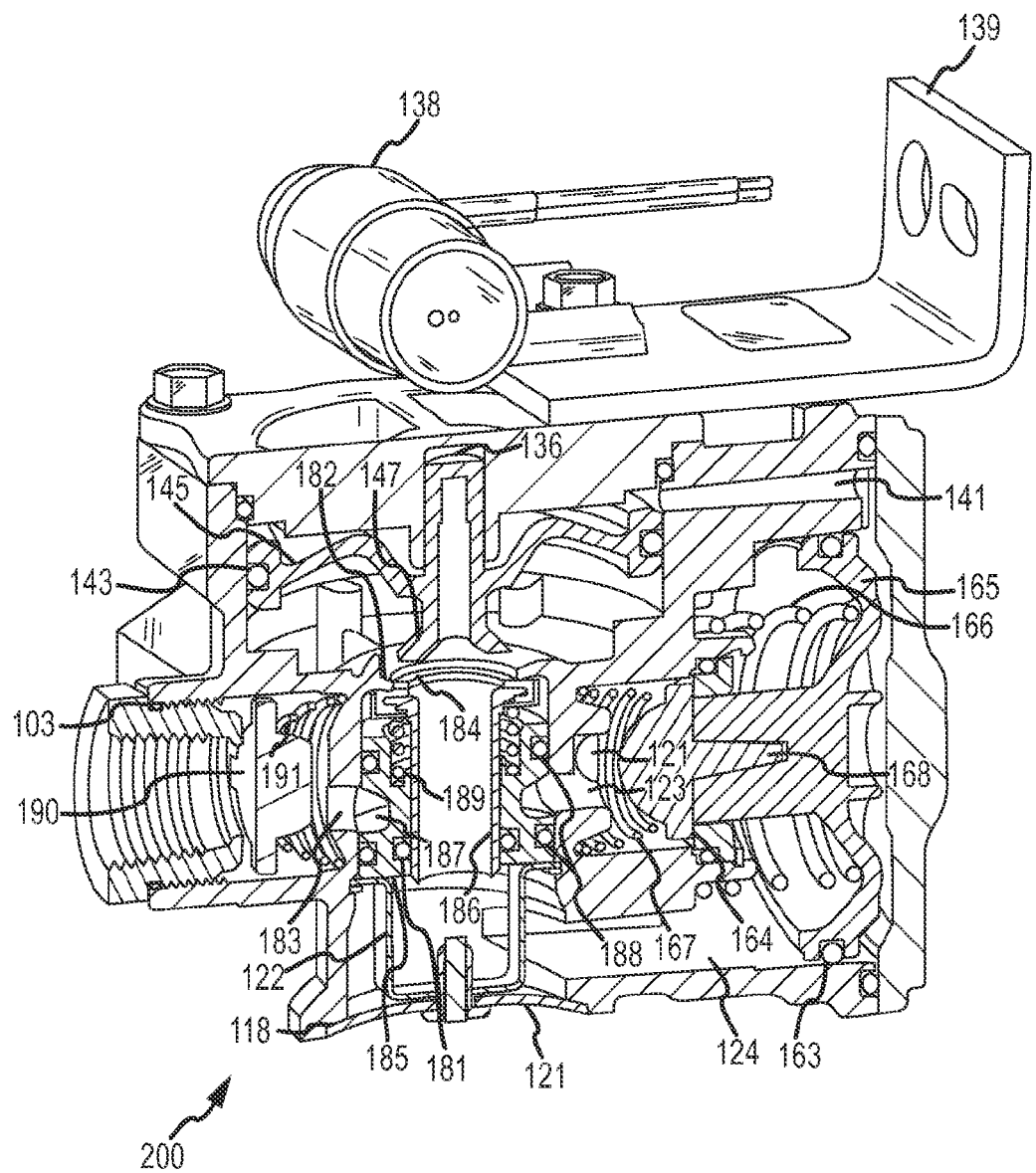
FIG. 6 is a cross-section view that shows the lift axle control valve in a non-actuated state.

FIG. 6 is a cross-section view that shows the lift axle control valve 200 in a non-actuated state. This view shows a pilot piston 145 in the pilot valve piston chamber 140, a lift piston 165 in the lift piston chamber 160, and a load spool 185 and load piston 186 in the load piston chamber 180.

In this de-energized, non-actuated state, the vehicle port 103 is connected to the one or more lift bag output ports 121A and 121B, pressurizing the one or more lift bags 120A and 120B. This lifts or maintains the lifted position of the lift axle. In addition, the one or more load bag output ports 131A and 131B are connected to the vent port 118, wherein the one or more load bags 130A and 130B are vented. In contrast, the suspension port 106 is not connected to any outputs of the lift axle control valve 200.

The pilot piston 145 can move fully or partially upward when the solenoid 138 is de-energized and is forced fully downward when the solenoid 138 is energized. The pilot piston 145 is sealed in the pilot valve piston chamber 140 by a pilot chamber seal 143. An upper portion 136 of the pilot piston 145 is acted on by pilot pressure pneumatic air and a pilot actuating end 147 comprises a lower portion thereof. The pilot actuating end 147 contacts the upper end of the load piston 186 when the solenoid 138 is energized, but will not contact the load piston 186 when de-energized. On the contrary, the pilot actuating end 147 of the pilot piston 145 will be lifted up away from the load piston 186, creating a gap therebetween.

When the solenoid 138 is de-energized, no pilot pressure is provided above the pilot piston 145 or to the right of the lift piston 165. When the solenoid 138 is energized, however, pilot pressure pneumatic air is provided above the pilot piston 146 and to the right of the lift piston 165. The pilot pressure will force the pilot piston 145 downward and will force the lift piston 165 to the left in the figure.

When the solenoid 138 is de-energized, the load bag pressure will be present in the pilot valve piston chamber 140, below the pilot piston 145, via the load bag output port 131 (see FIG. 4). The load bag pressure will keep the pilot piston 145 forced at least partially upwards. It should be understood that as the one or more load bags 130A and 130B are vented, the pilot piston 145 may drop somewhat. However, the pilot piston 145 will only move fully downward when the solenoid 138 is energized.

The lift piston 165 is sealed in the lift piston chamber 160 by a lift piston seal 163. The lift piston 165 includes a first lift piston biasing device 166 acting on the lift piston 165, and includes a second lift piston biasing device 167 acting on the lift piston poppet seal 168. Both biasing devices force the lift piston 165 to the right in the figure. Absent any pressure to the right of the lift piston 165 (provided by the pilot-lift passage 141), the lift piston 165 will move fully to the right. The two biasing devices 166 and 167 will therefore at least partially counteract a pressure to the right of the lift piston 165.

When the lift piston 165 is at a right position according to the figure, the lift piston poppet seal 168 sealingly contacts a lift piston poppet stop 164. As a result, when the solenoid is de-energized, the lift-load passage 123 is unblocked and an area around a lift piston poppet stop 164 is blocked. This places the one or more lift bag output ports 121 in fluid communication with a groove 187 formed at least partially around the load spool 185 and therefore in fluid communication with the vehicle port 103. Vehicle pressure air is therefore supplied to the one or more lift bag output ports 121, lifting the lift axle.

The load spool 185 is substantially fixed in position when assembled into the load piston chamber 180, while the load piston 186 can move vertically with respect to the figure. Spool seals 188 seal the load spool 185 to the load piston chamber 180. A load piston biasing device 189 forces the load piston 186 upward, against the operation of the pilot piston 145 when the solenoid 138 is energized. The load piston biasing device 189 will move the pilot piston 145 upward when the solenoid 138 is de-energized, but only as far upward as the pilot piston 145 can move.

The load piston 186 is hollow and is sealed to the load spool 185 by a piston seal 181. A seal ring 184 is affixed to a top of the load piston 186 and is sealingly contacted by the pilot actuating end 147 of the pilot piston 145. The seal ring 184 includes an aperture that allows fluid passage down through the load piston 186. The seal ring 184 can be permanently or removably affixed to the load piston 186. The seal ring 145 can be configured to fit over a portion of the load piston 186, can be bonded to a surface of the load piston 186, or can be affixed to the load piston 186 in other ways.

When the solenoid 138 is de-energized, as shown in the figure, the pilot actuating end 147 of the pilot piston 145 is moved away from the load piston 186. The load piston 186 is held fully upward by the biasing device 189, with the sealing ring 184 sealing against the load chamber lip 182. Because the pilot actuating end 147 of the pilot piston 145 is up off the load piston 186, air from below the pilot piston 145 can pass down the center of the load piston 186. As a result, the one or more load bag output ports 131 of the pilot chamber 140 are in communication with the lower part of the load piston chamber 180 and the vent port 118. Consequently, the load bags 130A and 130B are vented when the solenoid 138 is de-energized.

The vent port 118 is normally blocked by a vent diaphragm 121 that is held in place by a vent diaphragm support 122. The vent diaphragm 121 can be at least partially flexible. A flexibility or springiness of the vent diaphragm 121 may cause the vent diaphragm 121 to maintain position, blocking the vent port 118. Therefore, in the absence of pressure above the vent diaphragm 121, the vent diaphragm 121 will block the vent port 118. However, when the volume above the vent diaphragm 121 receives vent air at a pressure higher than an ambient pressure, then the vent diaphragm 121 will at least partially deform and allow air to escape out from the vent port 118. In this manner, depending on the positions of the various pistons, the vent port 118 can alternatingly vent air from either the one or more lift bags 120A and 120B or the one or more load bags 130A and 130B.

The lift axle control valve 200 further includes a check valve 190 and check valve biasing device 191 located in the vehicle port 103. In the absence of sufficient pressure in the supply conduit connected to the vehicle port 103, the check valve biasing device 191 will move the check valve 190 into sealing contact with the end of a supply conduit fitting (shown). As a result, when the vehicle pressure drops, the check valve will close and prevent a loss of pressure in the lift bags 120A and 120B.

It should be understood that alternatively the pilot piston 145 can be pneumatically actuated without solenoid control. For example, a pilot pneumatic pressure can be introduced into the pilot-lift passage 141 and therefore (or alternatively) be introduced above the pilot piston 145 and/or to the right of the lift piston 165. The pilot pneumatic pressure can subsequently operate to actuate the pilot piston 145 and force the pilot piston 145 downward and actuate the lift piston 165 to the left.

Figure 7:
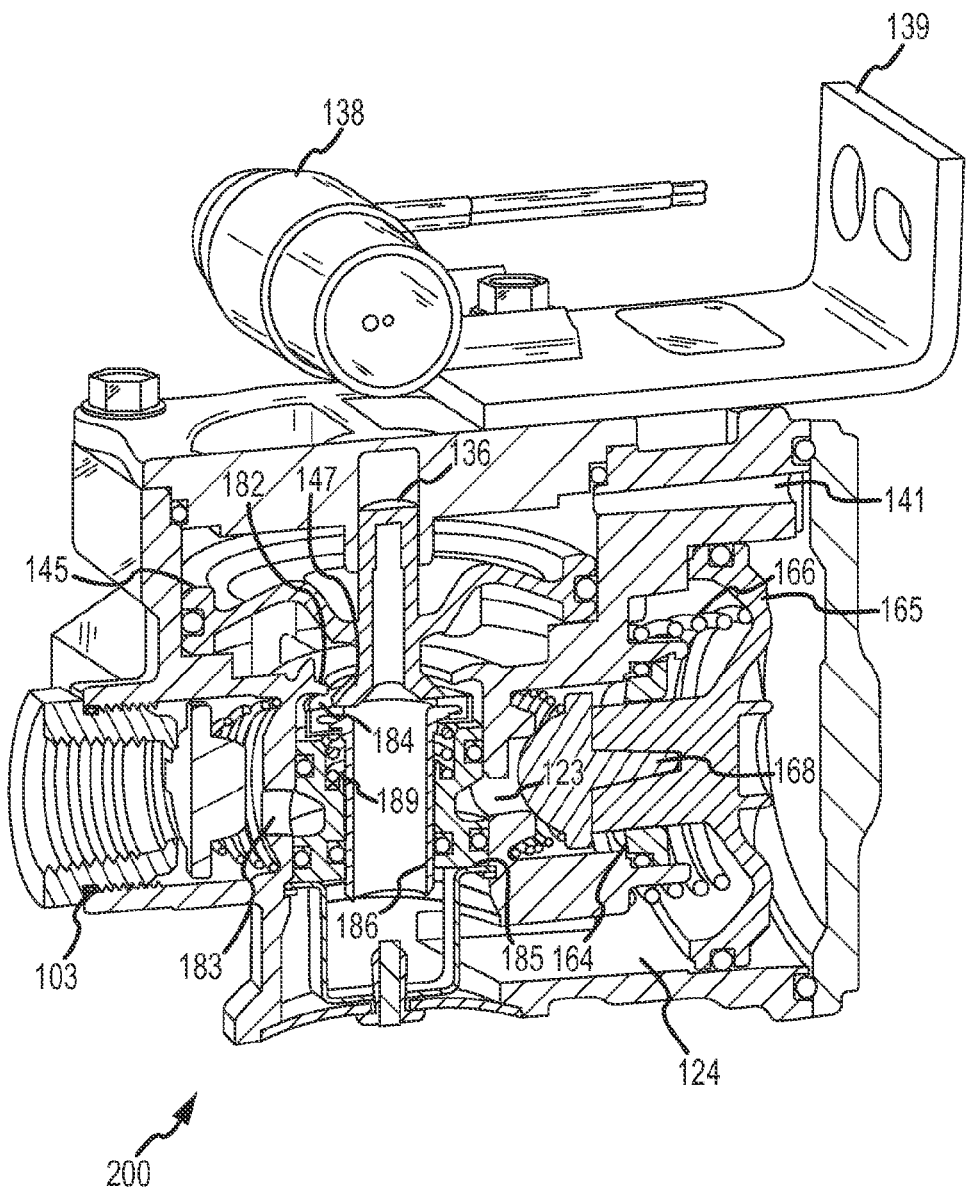
FIG. 7 is a cross-section view that shows the lift axle control valve in an actuated state.

FIG. 7 is a cross-section view that shows the lift axle control valve 200 in an actuated state. In this energized, actuated state, the suspension port 106 is connected to the one or more load bag output ports 131A and 131B, pressurizing the one or more load bags 130A and 130B. This deploys the lift axle and presses the lift axle down according to the suspension pressure. In addition, the one or more lift bag output ports 121A and 121B are connected to the vent port 118, wherein the one or more lift bags 120A and 120B are vented. In contrast, the vehicle port 103 is not connected to any outputs of the lift axle control valve 200.

The solenoid 138 is energized in this figure, providing pilot pressure above the pilot piston 145 and forcing the pilot piston 145 downward. The pilot actuating end 147 contacts the upper end of the load piston 186 when the solenoid 138 is energized. The pilot pressure also moves the lift piston 165 fully to the left, via the pilot-lift passage 141, wherein the lift piston 165 moves substantially in conjunction with the pilot piston 145. Movement of the pilot piston 145 downward also pushes the load piston 186 downward, moving the seal ring 184 away from sealing contact with the load chamber lip 182. As a result, the lower portion of the pilot chamber 140 is in fluid communication with the load chamber 180. Therefore, the suspension port 106 is in fluid communication with the one or more load bag output ports 131 in the pilot chamber 140, wherein suspension pressure air is provided to the one or more load bags 130A and 130B.

When the lift piston 165 moves to the left, a lift piston poppet seal 168 blocks the lift-load passage 123. As a consequence, an air passage around the lift piston poppet stop 164 is unblocked. The one or more lift bag output ports 121 (behind the lift piston poppet seal 168) are thereby placed in fluid communication with the lift-vent passage 124. This vents the one or more lift bags 120A and 120B.

We claim:

1. A lift axle control valve (200) for controlling a vehicle lift axle, the lift axle control valve (200) comprising:
a vehicle port (103) configured to receive a vehicle pressure;
a suspension port (106) configured to receive a suspension pressure, with the suspension pressure comprising a pressure that is controlled according to one or more suspension characteristics of the vehicle; and
wherein the lift axle control valve (200) is configured to receive a lift axle control signal, actuate the lift axle control valve (200) to connect one or more lift bag output ports (121) to the vehicle port (103) and the vehicle pressure and to connect one or more load bag output ports (131) to the vent port (118) if the lift axle control signal comprises a lift command, and actuate the lift axle control valve (200) to connect the one or more load bag output ports (131) to the suspension port (106) and the suspension pressure and connect the one or more lift bag output ports (121) to the vent port (118) if the lift axle control signal comprises a load command.

2. The lift axle control valve (200) of claim 1, wherein the suspension pressure is regulated to substantially achieve a predetermined suspension height.

3. The lift axle control valve (200) of claim 1, wherein the one or more lift bag output ports (121) and the one or more load bag output ports (131) are coupled to one or more lift axles.

4. The lift axle control valve (200) of claim 1, with the lift axle control valve (200) further including a solenoid (138) and with the solenoid (138) receiving an electrical lift axle control signal.

5. The lift axle control valve (200) of claim 1, with the lift axle control valve (200) receiving a pneumatic lift axle control signal.

6. A method of controlling a vehicle lift axle valve, comprising:
receiving a vehicle pressure air supply;
receiving a suspension pressure air supply, with the suspension pressure comprising a pressure that is controlled according to one or more suspension characteristics of the vehicle;
receiving a lift axle control signal;
actuating the lift axle control valve to connect one or more lift bag output ports to a vehicle port and the vehicle pressure air supply and to connect one or more load bag output ports to a vent port if the lift axle control signal comprises a lift command; and
actuating the lift axle control valve to connect the one or more load bag output ports to a suspension port and the suspension pressure air supply and connect the one or more lift bag output ports to the vent port if the lift axle control signal comprises a load command.

7. The method of claim 6, wherein the suspension pressure is regulated to substantially achieve a predetermined suspension height.

8. The method of claim 6, wherein the one or more lift bag output ports and the one or more load bag output ports are coupled to one or more lift axles.

9. The method of claim 6, further comprising receiving an electrical lift axle control signal.

10. The method of claim 6, further comprising receiving a pneumatic lift axle control signal.

* * * * *